United States Patent [19]
George et al.

[11] Patent Number: 5,391,389
[45] Date of Patent: Feb. 21, 1995

[54] PRODUCT AND PROCESS OF BLANCHING NUTS

[76] Inventors: Dewey P. George, P.O. Box 1527, San Andreas, Calif. 95249; Ronald J. Rigge, 2257 Goldcrest Cir., Pleasanton, Calif. 94566; Delbert L. Williams, 7535 Baldwin Rd., Valley Springs, Calif. 95252

[21] Appl. No.: 35,721

[22] Filed: Mar. 23, 1993

[51] Int. Cl.$^6$ .............................. A23L 1/36
[52] U.S. Cl. ........................ 426/632; 426/481; 426/482; 426/539; 426/626; 426/634
[58] Field of Search .............. 426/632, 634, 235, 253, 426/254, 258, 294, 539, 626, 459, 481, 482

[56] References Cited
U.S. PATENT DOCUMENTS

| | | |
|---|---|---|
| 2,155,923 | 4/1939 | Armstrong .................... 426/254 |
| 2,156,406 | 5/1939 | Stagmeier . |
| 2,273,183 | 2/1942 | Edes . |
| 2,277,485 | 3/1942 | Fraizer et al. . |
| 2,651,345 | 9/1953 | Schoolcraft . |
| 2,687,155 | 8/1954 | D'Aquin et al. . |
| 3,520,340 | 7/1970 | Takeuchi . |
| 4,276,316 | 6/1981 | Sharma . |
| 4,959,236 | 9/1990 | Gunnerson et al. . |

*Primary Examiner*—Helen Pratt
*Attorney, Agent, or Firm*—Limbach & Limbach

[57] ABSTRACT

A product and process of removing the skins from nuts involves wetting the nut kernels with an alkaline solution and then with a peroxygen solution. The two substances react underneath the skin to liberate gas between the nut meat and the skin. The gas bubbles blister the skin, causing it to become loosened. Slight mechanical brushing is used to dislodge the blistered skins from the nut meats.

28 Claims, 1 Drawing Sheet

PRODUCT AND PROCESS OF BLANCHING NUTS

FIELD OF THE INVENTION

The present invention relates to the field of removing the skin from the nut meats, and particularly to removing the skins from nuts such as hazelnuts, almonds and Brazil nuts which have tightly adhering skins.

BACKGROUND OF THE INVENTION

A nut kernel, the component of the nut that remains after shelling, is comprised of a nut meat that is covered by a brownish skin. Removal of the skin, a process called blanching, is desired for many varieties of nuts. For example, the skins of hazelnuts and Brazil nuts have unpleasant bitter tastes. For other nuts, such as almonds, removal of the skin is desired to prevent the brownish skin from coloring foods that are prepared using the nuts.

Certain nuts, such as hazelnuts and Brazil nuts, have a tightly adhering skin which is difficult to remove due to deeply embedded vein networks, The convoluted surfaces of these and other nuts, such as almonds, make it difficult to abrade the skins from the nuts without significant loss of nut meat. Often mechanical abrasion of these nuts results in a loss of 10 to 20% of the valuable nut meat.

Various other processes have been used for removing the skin from these types of nuts. These processes have enjoyed limited success. For the most part, existing processes are unsatisfactory because they do not completely remove the skin without abrading away significant amounts of nut meat or because they adversely affect the taste, appearance or shelf life of the nuts.

Some existing processes involve removing the skins by high pressure jets of water or by scalding water. Unfortunately, high water pressure also may erode areas of the nut meat and create pits in the surface of the nuts. Breakage is also known to occur. Further, nuts treated with these methods tend to absorb water and thus require drying, a process which weakens the flavor of the nuts by causing them to lose some of their oils. Almonds are commonly blanched by scalding, but this process also requires extended periods of drying and a resultant decrease in flavor.

In a common chemical process for removing skins from nut kernels, the nuts are first immersed in an alkaline bath, subsequently immersed in an acid bath, and finally subjected to mechanical abrasion. Alkaline solutions are believed to break down the oily component thought responsible for adhering the skin to the nut meat. Because alkaline solutions discolor the nut meats making them commercially undesirable, the subsequent acid bath is thus used to prevent discoloration. The acid leaves the nuts with an unpleasant bitter taste and may reduce their shelf life. Moreover, the concentrations of the chemical solutions dilute over the soaking period because of debris introduced into the solutions by the nuts. Dilution makes regulation of the concentration of the solutions highly difficult and renders these processes unfeasible for large scale blanching operations.

Hazelnuts are frequently blanched by roasting the nuts at approximately 350° F. for 7 minutes and then mechanically abrading the skins from the nuts. Although this method is satisfactory at removing the nut skins, it produces nuts having a roasted flavor.

SUMMARY OF THE INVENTION

It is an object of the present invention to provide a method and apparatus for removing the skin from nut kernels without adversely affecting the taste, appearance, or shelf life of the nuts and without abrading away valuable nut meat. It is a further object of the present invention to successfully remove nut skins which are particularly difficult to remove because of deep veins or convoluted surfaces.

The present invention involves wetting the nut kernels in two steps: first with an alkaline solution and then with a peroxygen solution. The two substances then react to liberate gases underneath the skin. The gas bubbles blister the skin, causing it to become loosened. The peroxygen solution also prevents the discoloration of the nuts that would otherwise be caused by the alkaline solution.

A mechanical device is used to separate the blistered skins from the nut meats. The preferred apparatus recycles the alkaline and peroxygen solutions separately within the system, while closely regulating the temperature and concentration of the reagents.

DETAILED DESCRIPTION OF THE INVENTION

Figure 1:
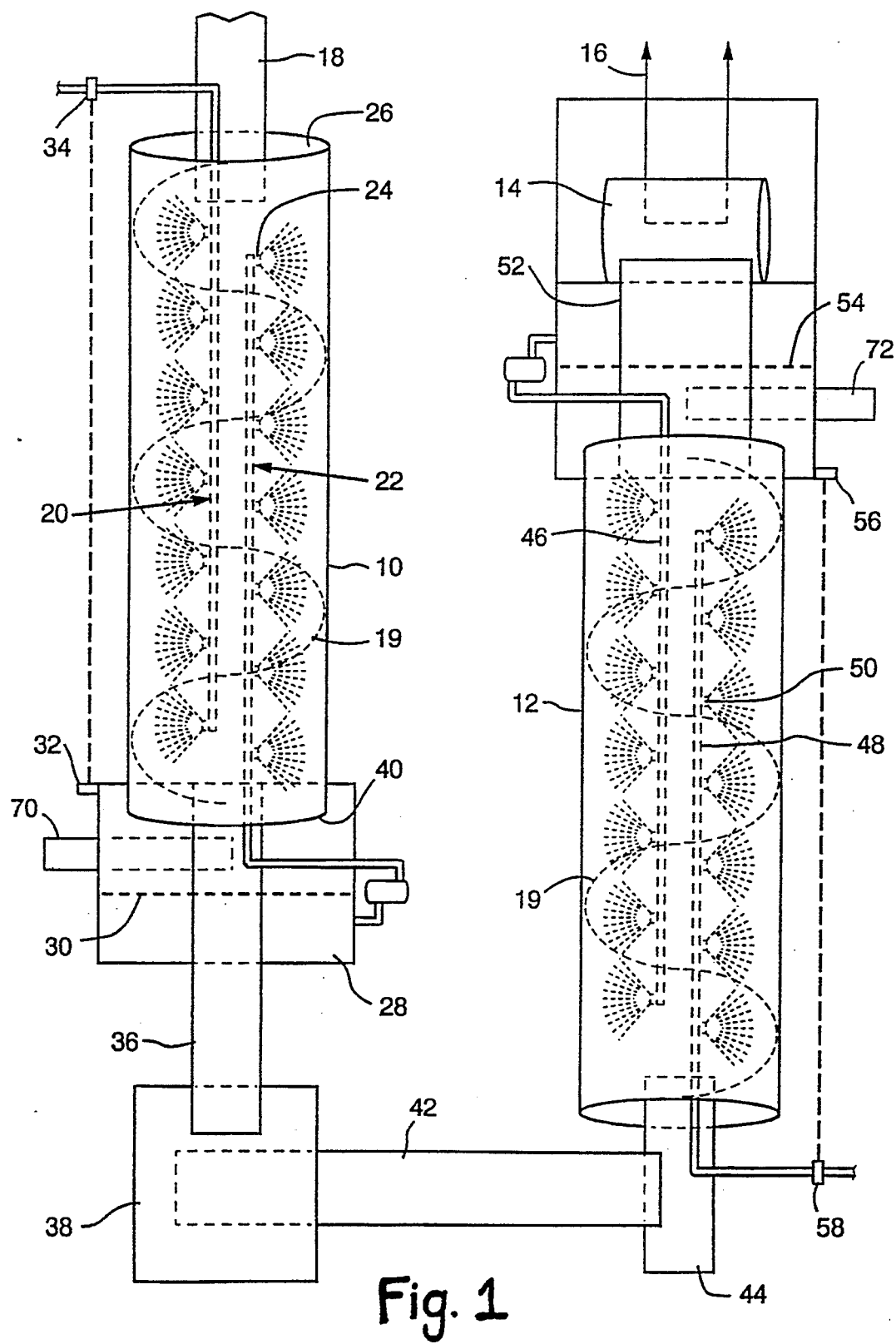
FIGURE 1 is a schematic representation of the nut blanching apparatus of the present invention.

The method of the present invention generally involves wetting the nuts with an alkaline solution, wetting of the nuts with a peroxygen solution, and mechanical removal of the skins from the nuts.

The first step of the process preferably involves wetting the nuts with an alkaline solution. Alkaline solutions are known to partially break the bonds which adhere the cellulosic skin to the nut meat. The preferred method utilizes food grade sodium carbonate, although other alkaline agents such as sodium bicarbonate, sodium silicates, sodium phosphates, and borates have been shown to work well. Alkaline salts of lithium, potassium, magnesium, and calcium will work satisfactorily but are more costly to use.

Alkaline solutions of 1% to saturated having approximate temperatures of 5° to 49° C. (40° to 120° F.) are preferable for use in the process, particularly when applied to the nuts for durations of between 20 seconds and 20 minutes.

In the preferred method, the nuts are wetted with 10% $Na_2CO_3$ at 35° C. (95° F.) for 2 to 3 minutes. Exposure time may be increased to up to 10 minutes if accompanied by a reduction in temperature to 21° C. (70° F.). While the blanching will be successful at prolonged exposure times and/or temperatures in excess of 50° C. (122° F.), these conditions tend to make the nuts more fragile and also may reduce shelf life and for these reasons should preferably be avoided.

The nuts are next preferably allowed to drain and to partially dry for preferably 3-5 minutes at ambient temperature. While drying is not necessary for successful blanching, it allows the nuts to cool and thereby reduces the likelihood of rancidity, breakage, and reduced shelf life. Drying at ambient temperature may last up to 30 minutes without significant adverse consequences.

After drying, the nuts are wetted using a peroxygen compound. Hydrogen peroxide is preferred for economic reasons and also because it removes the discoloration of the nut meats caused by the alkaline solution. Other preferred solutions are sodium peroxides, percarbonates, perborates and persulfates, however these are somewhat more costly to use in the process.

Peroxygen concentrations of 10-40% work particularly well in the process when applied to the nuts at temperatures of approximately 10° to 79° C. (50° to 175° F.) for durations of between ½ minute and 20 minutes. Although blanching will be successful when the nuts are treated with peroxygen solutions having temperatures greater than 80° C. (176° F.) or if they are exposed for periods of longer than 200 seconds to peroxygen solutions having temperatures of 77° C. (170° F.) or higher, these conditions should preferably be avoided to prevent cooking, rancidity, and breakage of the nuts. For economic reasons, the nuts are preferably treated for 150 seconds with a 15% solution of hydrogen peroxide maintained at 65° C. (149° F.).

Once the nuts have been exposed to the hydrogen peroxide, the hydrogen peroxide and the sodium carbonate chemically react to liberate gas. Gas bubbles form between the nut skin and the nut meat causing blistering and loosening of the skin. A mechanical method such as light brushing is used to remove the skins and the nuts are allowed to dry.

The preferred apparatus for carrying out the invention is shown in FIGURE 1. The apparatus generally comprises a pair of rotating spray drums 10, 12 which apply the sodium carbonate and hydrogen peroxide solutions to the nuts, a skin dislodging device 14 which mechanically removes the skins at the end of the process, and an air separator (not shown) which separates the removed skins from the nuts. Because, as described above, the temperature, concentration, and duration of exposure must be maintained within specified ranges, the preferred apparatus is designed to ensure that the solution applied to the nuts is maintained at the predetermined temperature and concentration values.

The nuts are carried on a standard conveyer 18 into the first spray drum 10. The spray drum 10 is positioned at a slight downward angle and includes a standard screw auger (not shown) for pushing the nuts through the spray drum. The various parameters for the spray drum configuration are dependent upon the amount of exposure time which is desired for the nuts. Positioned inside the spray drum 10 are two non-rotating rows 20, 22 of spray nozzles 24 which spray sodium carbonate solution onto the nuts as the nuts are rotated inside the spray drum. Two variables, the speed of rotation of the spray drum and the area of the inner surface 26 of the spray drum falling within the path of the spray 27, determine how long the nuts are exposed to the solution per rotation of the drum. A second two variables, the angle of the spray drum and the speed at which the screw auger pushes the nuts out of the drum, determine how long the nuts are inside the drum and thus how many times the nuts pass through the spray 27. These four variables must therefore be chosen based upon the length of time for which it is desired to expose the nuts to the solution. A variable speed spray drum is preferred to enable exposure time to be adjusted.

The spray nozzles 24 are preferably arranged in two parallel rows 20, 22 within the spray drum 10. The first row 20 is connected to a fresh source of sodium carbonate (not shown) while the second row 22 receives sodium carbonate from a recycle tank 28 positioned at the exit 40 of the spray drum. It is not necessary for the spray nozzles to deliver a high pressure stream of solution onto the nuts because the fluid pressure is not intended to be used for mechanical removal of skin. Because recycled solutions are delivered through the nozzles on the second row, large nozzles are preferable to prevent debris from clogging them. This will naturally result in a fairly low pressure spray.

The preferred apparatus is configured to recycle the runoff sodium carbonate, which is the sodium carbonate that runs off of the nuts during and after spraying, back onto the nuts through the second row 22 of spray nozzles. The runoff solution may carry dirt and other materials off the nuts and thus may become diluted. It is important, however, to maintain the concentration of the solutions being used to treat the nuts at a predetermined level so that the preselected concentration-dependant values for temperature and exposure time will be adequate for successful blanching of the nuts. As will next be described, the preferred apparatus recycles the runoff solution while maintaining the overall concentration of sodium carbonate being applied to the nuts.

A recycle tank 28 located at the bottom of the spray drum 10 collects the runoff solution as it flows out of the spray drum. This collected solution is passed through a trash screen 30, and a pump 31 pumps it to the second row 22 of spray nozzles 24 where it is sprayed onto the nuts. Positioned in the recycle tank 28 is a monitor 32 which detects the concentration of the runoff solution and which signals a concentration regulator 34 if adjustments in concentration are necessary. The concentration regulator 34 is located at the source of the fresh solution feeding into the first row 20 of spray nozzles 24. If the monitor 32 detects that the concentration of the solution in the recycle tank 28 is less than the predetermined concentration for treating the nuts, the concentration of the incoming fresh solution is increased so that the concentration of the mixture of fresh and recycled solutions reaching the nuts is maintained at the predetermined level.

The temperature of the solution must also be maintained at predetermined levels. The fresh source of sodium carbonate is heated to the desired temperature by conventional heating means (not shown). A thermostatic regulator (not shown) positioned in the recycle tank monitors the temperature of the run-off solution and makes necessary adjustments to the temperature of the runoff solution.

A conveyer 36 for transporting the nuts to a holding hopper 38 is positioned near the exit 40 of the spray drum 10. The holding hopper holds the nuts during the draining and drying period. After the draining and drying period, an elevator 42 carries the nuts from the holding hopper to a feed conveyer 44 which transports them into the second spray drum 12 for application of hydrogen peroxide.

The second spray drum 12 operates the same as the first, with concentration and temperature being monitored and adjusted as described above.

A conveyor 58 carries the nuts from the second drum 12 to a skin dislodging device 14, such as a rotating cylindrical brush, which separates the skins that have been loosened by the reaction of the sodium carbonate with the hydrogen peroxide as described above. A cylindrical brush is preferable because it does not abrade the nuts but rather dislodges the already loosened skins by poking through them and pulling them away from the nuts.

A final conveyor 16 next carries the nuts from the cylindrical brush or other skin dislodging device 14 to an air separator (not shown). At this point the nuts are likely to be mixed together with the pieces of skin that were removed by the cylindrical brush. The air separator uses an air stream to separate the relatively heavy nuts from the lighter weight skins.

While certain details of the invention have been illustrated and described herein it is obvious that many modifications thereof may be made which fall within the scope of the following claims.

We claim:

1. A method for removing skin from nut meats, the method comprising the steps of: providing a first chemical solution comprising a solution of a food grade alkaline compound the first chemical solution having a concentration of approximately 1% to saturated, and a second chemical solution comprising a solution of a food grade peroxygen compound that is capable of reacting with the first chemical solution to form a gas, the second chemical solution having a concentration of approximately 10–40%;
   wetting a nut meat with the first chemical solution after removal of the nut meat from its shell;
   wetting the nut meat with the second chemical solution, forming a gas between the nut meat and a skin on the nut meat to loosen the skin; and
   removing the skin from the nut meat.

2. The method of claim 1 wherein the first chemical solution is a sodium carbonate solution and the second chemical solution is a hydrogen peroxide solution.

3. The method of claim 1 wherein:
   the providing step further provides at least one spray nozzle capable of delivering the first and second chemical solutions; and
   the step of wetting the nut meat with the first chemical solution includes the steps of:
      spraying a volume of the first chemical solution through the spray nozzle onto the nut meat, and
      allowing at least part of the volume of the first chemical solution to run off of the nut meat to form a first runoff volume,
      collecting at least part of the first runoff volume, and
      spraying the nut meat with at least part of the first runoff volume through the second row of spray nozzles.

4. The method of claim 3 wherein the method further includes the step of regulating the combined concentration of the fresh volume of the first solution and the portion of the first runoff volume sprayed onto the nut meat to equal a predetermined value.

5. A blanched nut having its skin removed according to the process of claim 1.

6. The method of claim 1 wherein the alkaline compound is selected from the group consisting of sodium carbonate, sodium bicarbonate, sodium silicates, sodium phosphates, borates, alkaline salts of lithium, alkaline salts of potassium, alkaline salts of magnesium, and alkaline salts of calcium.

7. The method of claim 1 wherein the peroxygen compound is selected from the group consisting of hydrogen peroxide, sodium peroxides, percarbonates, perborates, and persulfates.

8. The method of claim 1 wherein the nut meat is a hazelnut meat.

9. A blanched hazelnut having its skin removed according to the process of claim 8.

10. The method of claim 1 wherein the nut meat is an almond meat.

11. A blanched almond having its skin removed according to the process of claim 10.

12. The method of claim 1 wherein the nut meat is a Brazil nut meat.

13. A blanched Brazil nut having its skin removed according to the process of claim 12.

14. A method of removing skin from nut meats, the method comprising the steps of:
   providing a food grade alkaline solution having a concentration of approximately 1% to saturated;
   providing a food grade peroxygen solution having concentration of approximately 10–40%;
   wetting a nut having a skin with the alkaline solution after removal of the nut meat from its shell;
   removing excess liquid from the nut;
   wetting the nut with the peroxygen solution to blister the skin with gas produced by a reaction between the alkaline solution and the peroxygen solution; and
   removing the skin from the nut.

15. The method of claim 14 wherein:
   the step of prodding an alkaline solution includes the step of providing a sodium carbonate solution; and
   the step of providing a peroxygen solution includes the step of providing a hydrogen peroxide solution.

16. The method of claim 14, wherein:
   the step of wetting the nut meat with the alkaline solution includes the steps of:
      spraying the nut meat with a fresh spray of the alkaline solution;
      allowing the alkaline solution to run off the nut meat to form a runoff volume;
      collecting at least part of the runoff volume; and
      spraying the nut meat with at least part of the runoff volume.

17. The method of claim 16 wherein the method further includes the step of regulating the concentration of the alkaline solution being sprayed onto the nut meat to equal a predetermined value.

18. The method of claim 14 wherein:
   the step of wetting the nut meat with the peroxygen solution includes the steps of:
      spraying the nut meat with a fresh spray of the peroxygen solution;
      allowing the peroxygen solution to run off the nut meat to form a runoff volume;
      collecting at least part of the runoff volume; and
      spraying the nut meat with at least part of the runoff volume.

19. The method of claim 18 wherein the method further includes the step of regulating the concentration of the peroxygen solution being sprayed onto the nut meat to equal a predetermined value.

20. A blanched nut having its skin removed according to the process of claim 14.

21. The method of claim 14 wherein the alkaline solution comprises an aqueous solution of a compound selected from the group consisting of sodium carbonate, sodium bicarbonate, sodium silicates, sodium phosphates, borates, alkaline salts of lithium, alkaline salts of potassium, alkaline salts of magnesium, and alkaline salts of calcium.

22. The method of claim 14 wherein the peroxygen solution comprises an aqueous solution of a compound selected from the group consisting of hydrogen peroxide, sodium peroxides, percarbonates, perborates, and persulfates.

23. The method of claim 14 wherein the nut meat is a hazelnut meat.

24. A blanched hazelnut having its skin removed according to the process of claim 23.

25. The method of claim 14 wherein the nut meat is an almond meat.

26. A blanched almond having its skin removed according to the process of claim 25.

27. The method of claim 14 wherein the nut meat is a Brazil nut meat.

28. A blanched Brazil nut having its skin removed according to the process of claim 27.

* * * * *